United States Patent
Cucchi (10) Patent No.: US 9,498,826 B2
(45) Date of Patent: Nov. 22, 2016

(54) APPARATUS FOR FEEDING BARS TO A MACHINE TOOL

(71) Applicant: Cucchi Giovanni & C. S.R.L., Bussero (IT)

(72) Inventor: Cesare Cucchi, Bussero (IT)

(73) Assignee: CUCCHI GIOVANNI & C. S.R.L., Bussero (IT)

(*) Notice: Subject to any disclaimer, the term of this patent is extended or adjusted under 35 U.S.C. 154(b) by 149 days.

(21) Appl. No.: 14/410,159

(22) PCT Filed: Jun. 18, 2013

(86) PCT No.: PCT/EP2013/062640
§ 371 (c)(1),
(2) Date: Dec. 22, 2014

(87) PCT Pub. No.: WO2013/189937
PCT Pub. Date: Dec. 27, 2013

(65) Prior Publication Data
US 2016/0158845 A1 Jun. 9, 2016

(30) Foreign Application Priority Data
Jun. 22, 2012 (IT) ................. MI2012A1103

(51) Int. Cl.
| | |
|---|---|
| B23B 13/10 | (2006.01) |
| B23B 13/02 | (2006.01) |
| B23B 13/04 | (2006.01) |
| B23B 13/12 | (2006.01) |

(52) U.S. Cl.
CPC ............ *B23B 13/025* (2013.01); *B23B 13/04* (2013.01); *B23B 13/10* (2013.01); *B23B 13/126* (2013.01); *Y10T 82/2518* (2015.01)

(58) Field of Classification Search
CPC ... B23B 13/025; B23B 13/10; B23B 13/126; Y10T 82/2518; Y10T 82/2521; Y10T 82/2516
See application file for complete search history.

(56) References Cited

U.S. PATENT DOCUMENTS 2,742,656 A * 4/1956 Fischer ................. B23B 13/025
                                                                                     221/209
2,781,574 A * 2/1957 Lakins .................... B23B 13/04
                                                                                   221/293

(Continued)

FOREIGN PATENT DOCUMENTS

JP            54026578         2/1979

OTHER PUBLICATIONS

International Search Report of PCT/EP2013/062640 Sep. 19, 2013.

*Primary Examiner* — Sunil K Singh
*Assistant Examiner* — Alan Snyder
(74) *Attorney, Agent, or Firm* — Silvia Salvadori, P.C.; Silvia Salvadori (57) ABSTRACT

An apparatus for feeding bars to a lathe comprises a first end couplable with a spindle of the lathe; a stationary arrangement for guiding and supporting a bar in a first region; a drum element between a first end and an intermediate zone; a movable supporting arrangement provided on the drum element; the movable supporting arrangement is slidably drivable along the drum element parallel to the rotation axis between a contracted disengagement configuration, in which the movable supporting arrangement is collected near the first end to enable a bar to be positioned on the stationary guiding and supporting arrangement, and an extended engagement configuration, in which it is distributed between the first end and the intermediate zone to engage with the respective bar to be supported and guided.

13 Claims, 6 Drawing Sheets

(56) References Cited

U.S. PATENT DOCUMENTS

| | | | |
|---|---|---|---|
| 3,823,628 A * | 7/1974 | Fortune | B23B 13/025 414/17 |
| 4,407,176 A | 10/1983 | Link | |
| 5,115,702 A | 5/1992 | Link | |
| 5,662,014 A | 9/1997 | Link | |
| 8,146,465 B2 * | 4/2012 | Schaerer | B23B 13/025 414/15 |

\* cited by examiner

APPARATUS FOR FEEDING BARS TO A MACHINE TOOL

This application is a U.S. national stage of PCT/EP2013/062640 filed on 18 Jun. 2013, which claims priority to and the benefit of Italian Application No. MI2012A001103, filed on 22 Jun. 2012, the contents of which are incorporated herein by reference in their entirety.

The present invention relates to an apparatus for feeding bars to a machine tool, in particular to an automatic lathe.

An apparatus is known for feeding bars automatically to the spindle of a lathe. The apparatus extends, with a dimension that is prevalent in length, along a longitudinal axis that is parallel to a first rotation axis of the aforesaid spindle. An elongated drum is provided that extends from one end to the other of the apparatus and supports a plurality of guides that are openable for the bars. In other words, the drum extends over the entire length of the apparatus and is configured for rotating around a second rotation axis parallel to the aforesaid longitudinal axis. The openable guides are distributed both longitudinally along the drum and circumferally on the latter. Each openable guide comprises a fixed part, i.e. mounted in a stationary position on the drum, and a part that is transversely movable with respect to the longitudinal axis of the drum. The movable part, which is movable by suitable mechanisms, is first moved away from and then moved towards the respective fixed part so as to enable a bar to be inserted that has to be guided during machining. A plurality of bar-pushing members is further provided that are movably supported axially on a rear portion of the aforesaid elongated drum, each bar-pushing member being arranged for pushing towards the lathe a respective bar along a respective group of aforesaid openable guides that are aligned longitudinally.

A drawback of such an apparatus is that it is structurally rather complex, thus entailing rather a high manufacturing cost. The particular configuration given by the drum, which is very extended in length, on which many members are mounted, causes problems linked to dynamic stresses and vibrations during operation that force to have reduced operating speeds.

Owing to the structural complexity, problems of reliability also occur that cause costly maintenance work. Replacing parts, such as the openable guides or other components, entails rather laborious operations accompanied by inevitable lengthy downtime with consequent financial losses for the user.

An object of the present invention is to improve known apparatuses for feeding bars to machine tools.

Another object is to provide an apparatus for feeding bars to a machine tool that has a more simplified structural configuration than known apparatuses, that is very cheap to manufacture and to maintain and that reduces downtime due to possible replacement of mechanical parts.

The above can be achieved by an apparatus for feeding bars to a machine tool as defined in claim 1.

Owing to the invention the aforesaid drawbacks are overcome.

In particular, the apparatus according to the invention advantageously has an extremely simplified structural configuration compared with the apparatuses of the prior art, this resulting in a noticeable reduction of moving masses during operation, thus in a consequent conspicuous reduction in undesirable vibrations. Owing to the invention, an apparatus is obtained having great reliability, which thus requires significantly reduced maintenance and entails very short downtime if a component of the apparatus has to be dismantled, refitted or replaced.

Further features and advantages will be clear from the appended claims and from the description.

The invention can be better understood and implemented with reference to the attached drawings, which illustrate an embodiment thereof by way of non-limiting example, in which.

With reference to the enclosed Figures, there is shown an apparatus 1 for automatically feeding bars 2 to a machine tool, in particular a lathe that can be of the single-spindle or multispindle type.

In particular, the apparatus 1 has a first end 4 that is suitable for being placed in a position that is adjacent to a spindle of the lathe, and extends parallel to a longitudinal axis L that, during operation, is arranged parallel to a rotation axis of the spindle to be fed.

The apparatus 1 is fitted to a supporting frame 3 extending along the aforesaid longitudinal axis L between the first end 4 and a second end 5 of the apparatus 1, opposite the first end 4. On the supporting frame 3 a covering and protective casing 7 for the apparatus 1 is mounted. The first end 4 and the second end 5 are separated by a distance D.

The apparatus 1 comprises stationary guiding and supporting means 6 configured for supporting a bar 2 in a first supporting region R1 spaced apart from the first end 4. The stationary guiding and supporting means 6 extend, parallel to the longitudinal axis L, from the second end 5 to an intermediate zone I, interposed between the first end 4 and the second end 5. In particular, the intermediate zone I is situated in an internal, approximately median or central region, in the covering and protective casing 7.

The apparatus 1 is further provided with advancing means 19, for example pushing means 19, for making a respective bar 2 advance along the stationary guiding and supporting means 6.

In particular, the stationary guiding and supporting means comprise a stationary guiding and supporting element 6, of elongated shape, such as a metal profiled section or "V"-shaped element, along which a bar 2 can be rested and slid towards the spindle.

The stationary guiding and supporting element 6 extends for a first length L1 from the second end 5 as far as near the intermediate zone I, the first length L1 being in particular less than the aforesaid distance D.

Figure 1:
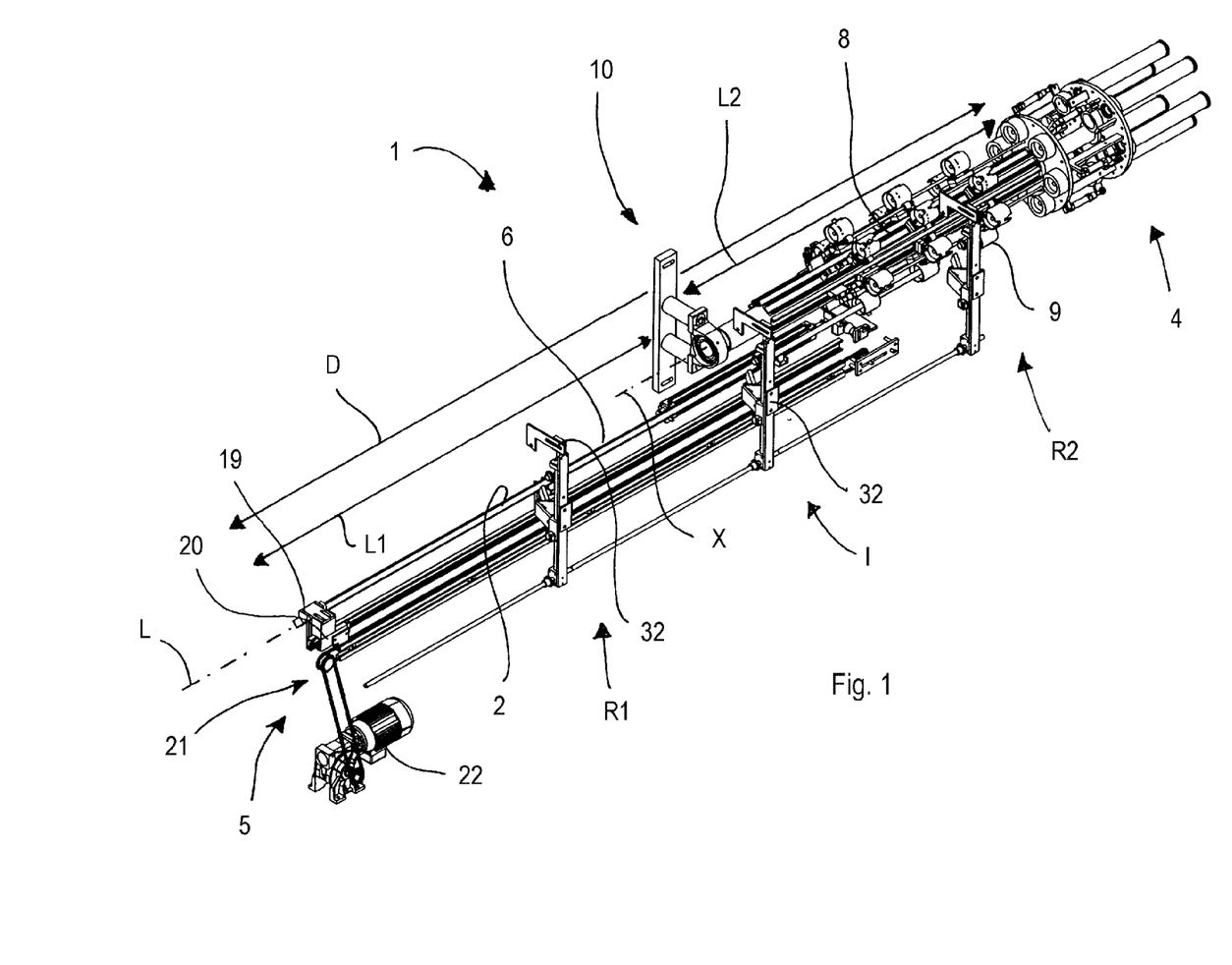
FIG. 1 is a perspective view of the apparatus according to the invention, in which for the sake of clarity some parts, such as a housing and protective casing, have been removed.
Figure 2:
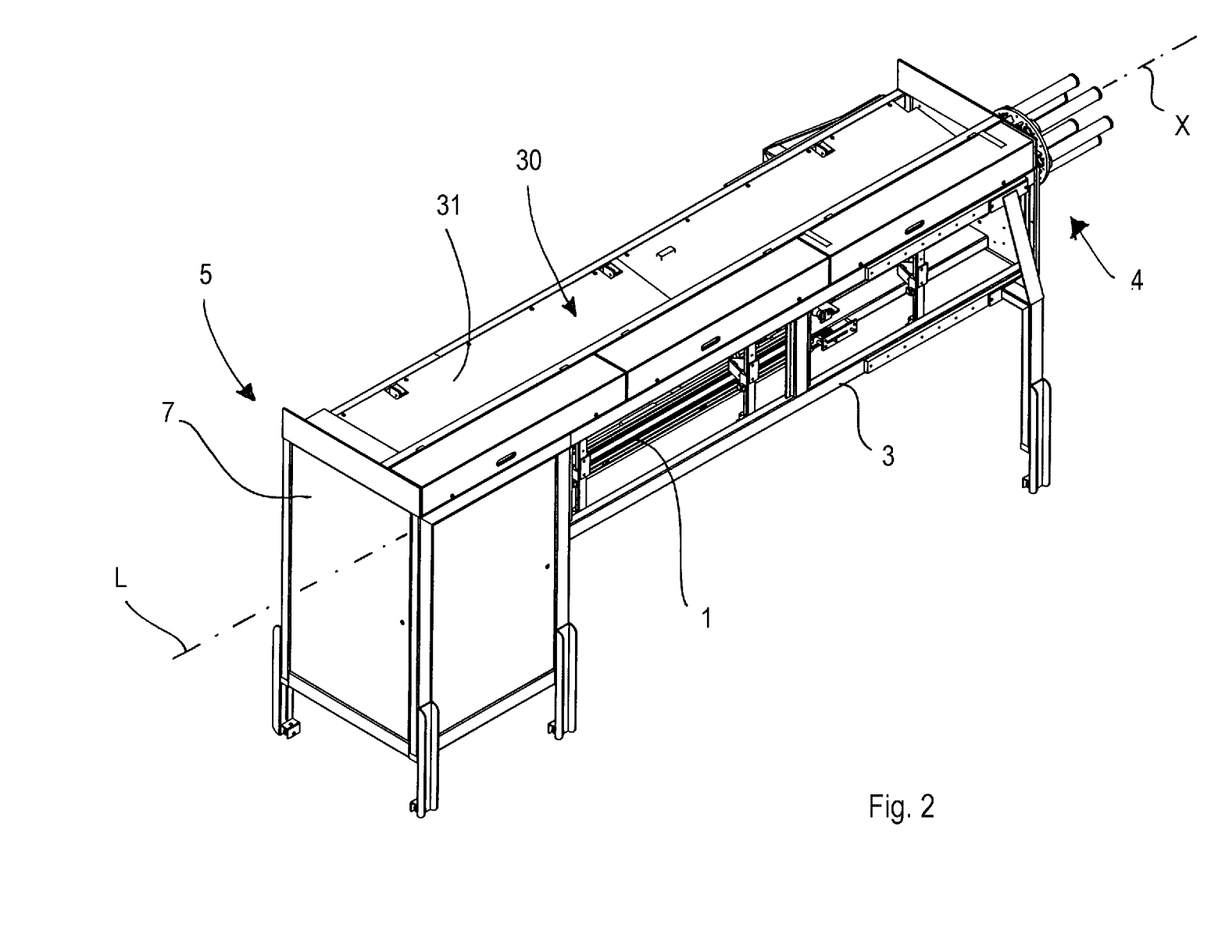
FIG. 2 shows the apparatus in FIG. 1 fitted inside a casing and protection.
Figure 3:
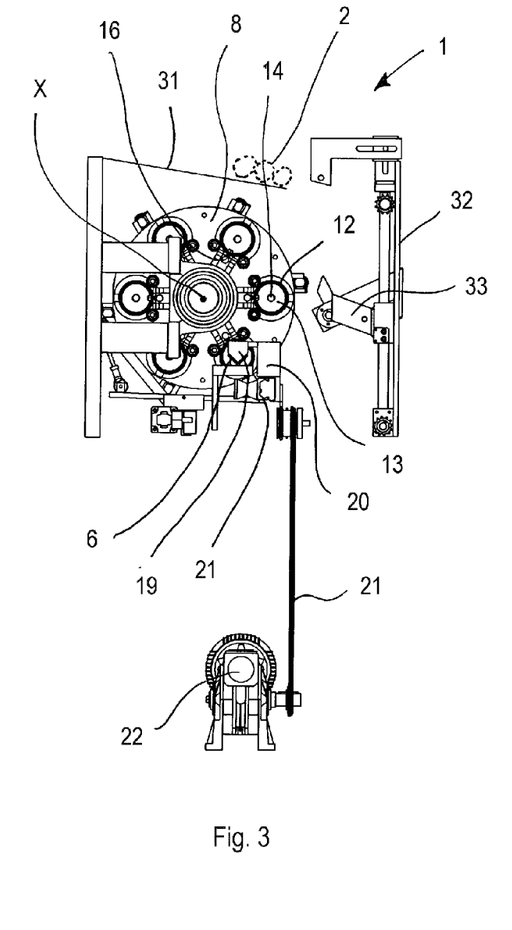
FIGS. 3 to 4 are respectively a rear view and a frontal view of the apparatus in FIG. 1.

In particular, the advancing means comprises a pusher 19 mounted on a slide 20 (see FIGS. 1 and 3) that is movable from the second end 5 to the intermediate zone I. The slide 20 is slidably coupled with a linear guide 21 that is parallel to the stationary guiding and supporting element 6 and is moved by a mechanism 21 of the chain or belt type driven by an electric motor 22.

In particular, the pusher 19 has a "V" profile that is such as to be received and coupled with the stationary guiding and supporting element 6.

The apparatus 1 comprises a drum element 8 that is rotatable around a rotation axis X parallel to the longitudinal axis L. On the drum element 8 movable supporting means 9 are fitted that are arranged for supporting and guiding a bar 2 parallel to the longitudinal axis L. The movable supporting means 9 are arranged for supporting a bar 2 in a second supporting region R2 adjacent to the first supporting region R1 and extending between the intermediate zone I and the first end 4.

The drum element 8 occupies a rather small region, in particular it has a reduced extent compared with the overall longitudinal dimension of the apparatus 1.

In particular, the drum element 8 extends between the first end 4 and the intermediate region I for a second length L2, less than the aforesaid distance D. In particular, the second length L2 is substantially less than half the distance D.

One end 10 of the drum element 8 is rotatably supported by a bush support 11 fixed to the supporting frame 3 in the intermediate zone I.

Figure 7:
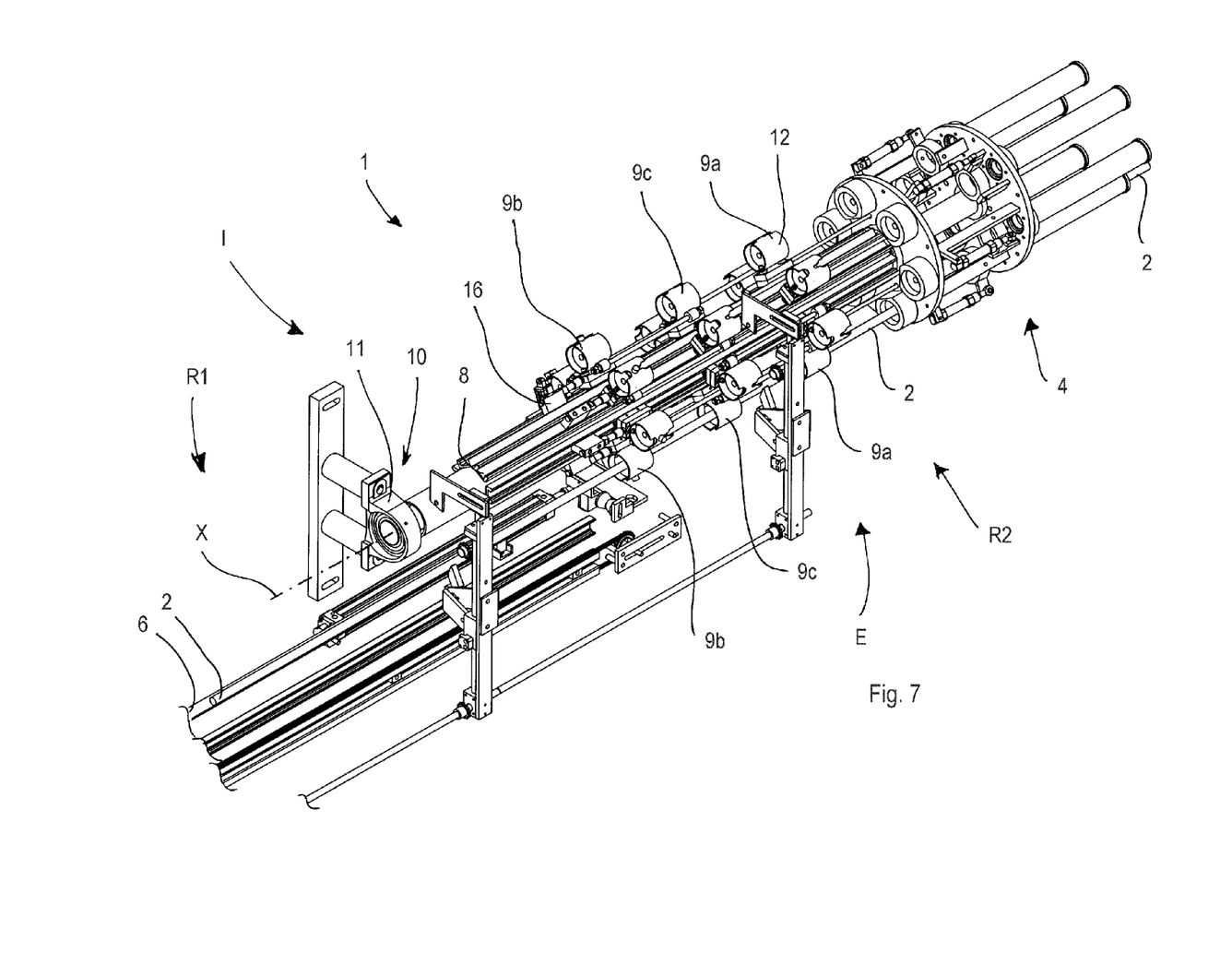
FIG. 7 is an enlarged detail of the apparatus in FIG. 1 in a third operating position.

The movable supporting means comprise carriage elements 9, which are slidably drivable along the drum element 8 parallel to the rotation axis X between a contracted disengagement configuration C (shown in FIG. 5), in which the carriage elements 9 are collected near the first end 4, in particular are arranged in a position of mutual "packed" or stacked contact to enable a bar 2 to be positioned on the elongated stationary guiding and supporting element 6, and an extended engagement configuration E (shown for example in FIG. 7), in which the carriage elements 9 are spaced apart from one another and are distributed in the region comprised between the first end 4 and the intermediate zone I in such a manner as to engage with a respective bar 2 located on the elongated element 6.

In the embodiment shown by way of non-limiting example in the Figures, the apparatus comprises several groups of carriage elements 9 distributed circumferally on the drum element 8, i.e. around the rotation axis X, and each group comprises three carriage elements 9 arranged in a mutually aligned position parallel to the rotation axis X. In particular, but in a non-limiting manner, six groups of carriage elements 9 are provided that are equally distributed on the drum element 8.

Figure 4:
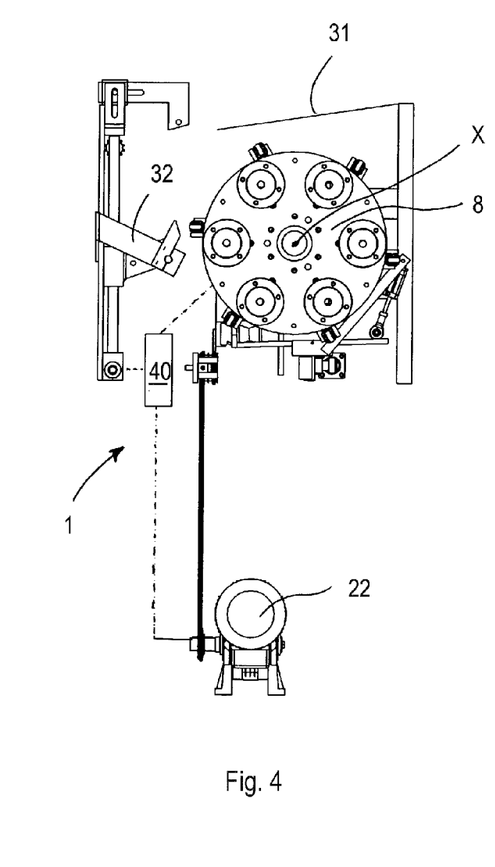

The apparatus 1 comprises rotating driving means, such as an electric motor commanded by a control and synchronisation unit 40 (shown schematically in FIG. 4), for rotating the drum element 8 in an indexed manner so as to arrange one group of carriage elements 9 at a time, in sequence, in an alignment position with the stationary guiding and supporting element 6.

In particular, each group of carriage elements comprises a front carriage element 9a, nearer the first end 4, a rear carriage element 9b, further from the first end 4, i.e. nearer the intermediate zone I when it is in the extended engagement configuration E, and an intermediate carriage element 9c interposed between the front carriage element 9a and the rear carriage element 9b. In the contracted disengagement configuration C, the front carriage element 9a engages in contact with a respective resting bush 15, the intermediate carriage element 9c, in turn, abuts on the front carriage element 9a, and the rear carriage element 9b abuts on the intermediate carriage element 9c.

In the extended disengagement configuration E, the front carriage element 9a, the intermediate carriage element 9c and the rear carriage element 9b are spaced apart from one another in a suitable manner so as to be distributed in the second supporting region R2 to engage with a respective bar 2 that rests at least partially on the stationary guiding and supporting element 6.

Each carriage element 9 comprises a cylindrical body 12, made of a single piece, or alternatively, of several parts fixed together to form a single body. Inside the cylindrical body 12 a transverse wall 13 is provided, of disc shape, on which a guiding and supporting opening 14 is obtained that is suitable for being traversed by a bar 2.

It is possible to provide openings 14 of different dimensions between one group of carriage elements and the other, so as to adapt to bars of different diameter or shape.

The cylindrical body 12 and the transverse wall 13, assembled together, define a single body.

The carriage elements 9, which thus act as guiding and supporting elements into which the bars 2 are inserted, having a monolithic structural configuration and being devoid of mutually movable or articulated parts, as on the other hand occurs with the openable guides of the prior art, bestow significant simplicity on the apparatus 1, thus reduced weight and vibrations, consequently bringing great reliability that thus enables possible maintenance work to be drastically reduced.

There are provided appropriate dragging or pushing means 16 for moving the carriage elements 9 from the contracted disengagement configuration C to the extended engagement configuration E and vice versa. In the embodiment shown by way of example, the dragging or pushing means 16 comprises, for each group of carriage elements 9, a slide element 16 that is slidable along a suitable grooved guide 18 fixed longitudinally to the drum element 8.

Connecting means 17 is further provided that is arranged for connecting together the carriage elements 9 of each group so as to transfer at least part of a movement of one carriage element to the other, enabling the three carriage elements to approach one other thus reaching the contracted disengagement configuration C, and to enable the three carriage elements to move away from one another to reach the extended engagement configuration E.

In particular, the connecting means 17 for each group comprises a first bar element 17a fixed to the intermediate carriage element 9c and slidably coupled with the rear carriage element 9a, and a second bar element 17b fixed to the front carriage element 9a and coupled slidably with the intermediate carriage element 9c.

Figure 5:
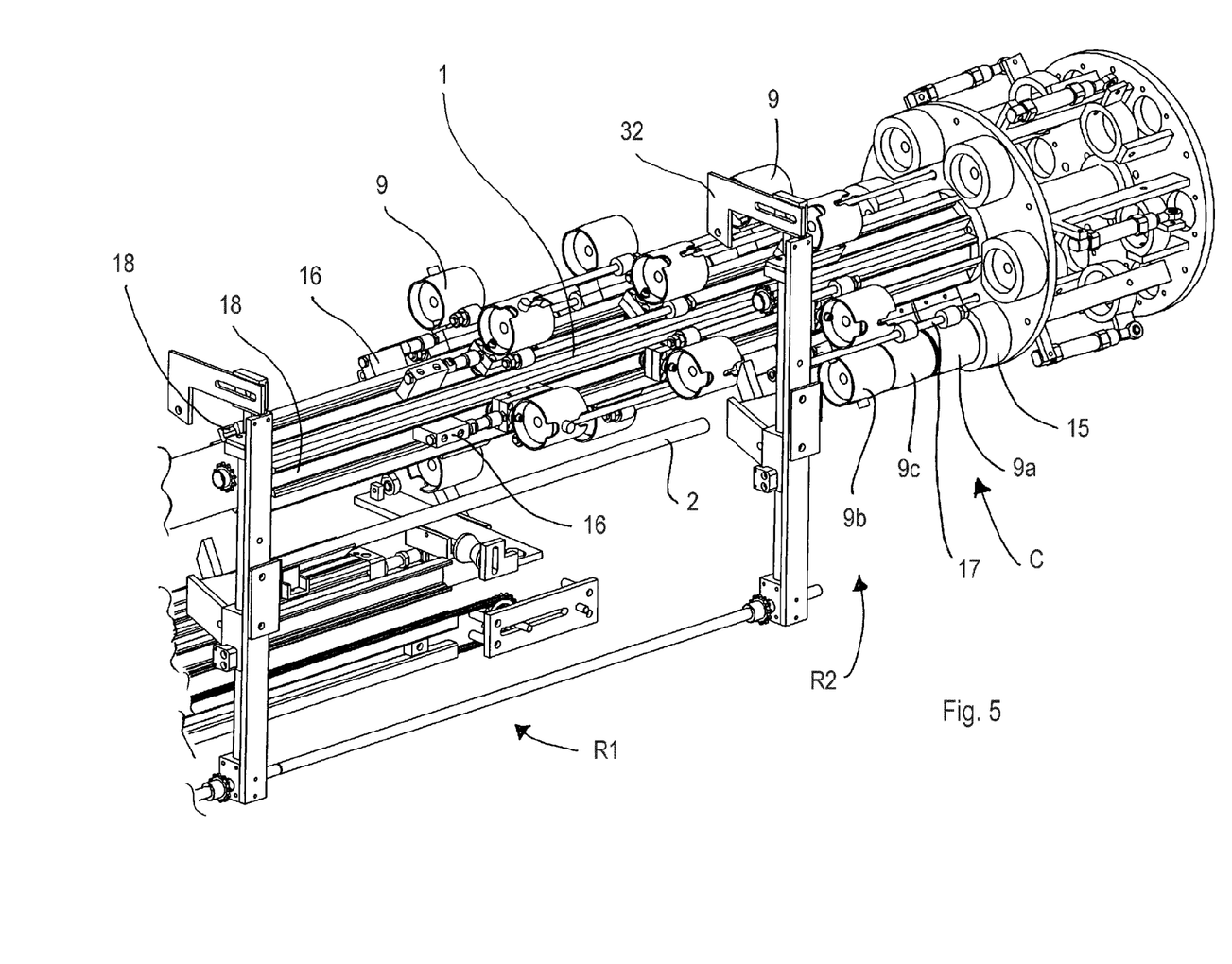
FIG. 5 is an enlarged detail of the apparatus in FIG. 1 in a first operating position.
Figure 6:
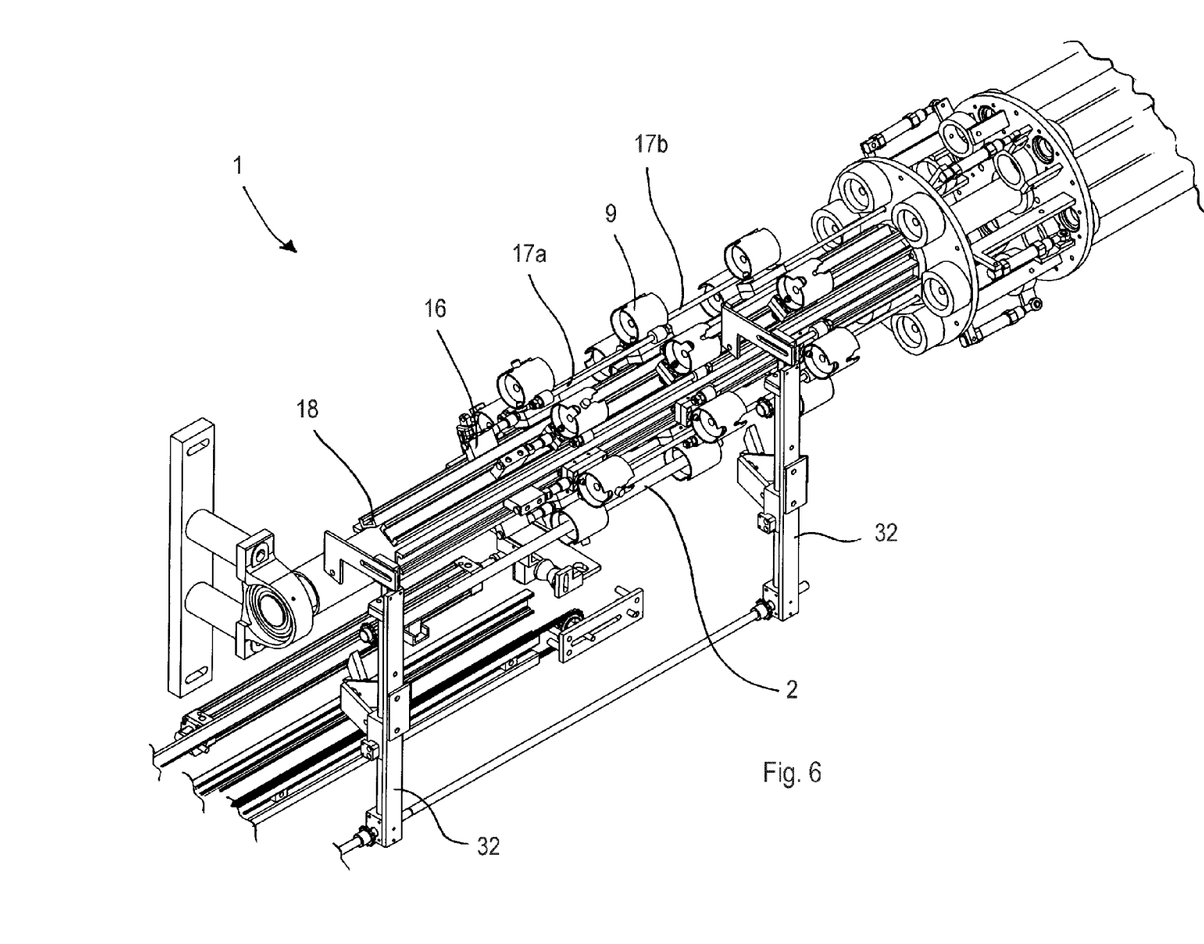
FIG. 6 is an enlarged detail of the apparatus in FIG. 1 in a second operating position.

The slide element 16, when it is driven, by acting directly on the respective rear carriage element 9b, pushes the latter towards the first end 4. The rear carriage element 9b in turn comes into contact with the intermediate carriage element 9c, which in turn interacts with the front carriage element 9a, forcing the front carriage element 9a to rest on the respective resting mouth 15, as shown in FIG. 5. On the other hand, when the slide element 16 is moved to the second end 5, i.e. moved away from the first end 4, the rear carriage element 9b is moved near the intermediate region I. During this step, owing to the first bar element 17a and to the second bar element 17b, the rear carriage element 9b drags or pulls the intermediate carriage element 9c, which in turn drags or pulls the front carriage element 9a.

The apparatus 1 is provided with a storage chamber 30 in which a plurality of bars 2 to be fed to a machine tool can be stored. The storage chamber 30 is located above the first supporting region R1 and comprises a tilted resting surface 31 for the bars 2. In the apparatus 1 removing and transferring means 32 is further included, having vertically movable shelves 33, movable arms 34 and further elements that are not shown or disclosed for the sake of simplicity of the description, which are arranged for removing one bar 2 at a time from the storage chamber 30 to transfer the bar 2 to the stationary guiding and supporting means 6.

The removing and transferring means 32, as also the advancing means 19, the drum element 8 and the dragging or pushing means 16, are operationally connected to the aforesaid control and synchronisation unit 40.

The control and synchronisation unit 40 acts to arrange a group of carriage elements 9 one at a time in a position aligned with the guiding and supporting element 6 and in the contracted disengagement configuration C so as to enable the removing and transferring means 32 to remove a bar 2 from the storage chamber 30 to return the bar 2 to the element 6, preventing the bar 2 from interfering, during transferring, with one or more carriage elements 9.

Once a bar 2 is loaded on the stationary guiding and supporting element 6, the control and synchronisation unit 40 intervenes so that the carriage elements 9 placed opposite the element 6 are arranged in the extended engagement configuration E so as to engage, via the guiding and supporting openings 14, with the bar, which in this manner is ready to be suitably guided and supported.

At this point, the pusher 19 is driven to push the bar to the second supporting region R2. The apparatus 1 can operate in different operating modes. In one operating mode, the pusher 19 continues to push the bar 2 to feed the machine tool until the bar 2 advances automatically in an independent manner from the machine tool, in the example, from the lathe. It is thus possible to repeat a new cycle of feeding a successive bar 2.

In another operating mode, the apparatus 1 operates in such a manner as to load, one at a time in sequence, all the groups of carriage elements 9, so as to load the entire drum element 8 with a plurality of bars 2, in the case in point with six bars 2. In this manner it is possible to feed the machine tool more rapidly, by repositioning each bar 2 supported by the respective carriage elements 9 at the pusher 9 to be fed to the spindle.

In the meantime, it is also possible to fill the storage chamber 30 again with further bars.

As can be appreciated from what has been disclosed above, the apparatus 1, advantageously, enables every single bar to be guided and supported over the entire length thereof and for the entire feeding path from the second end 5 to the first end 4. This is particularly appreciable when the bars 2 have very reduced cross sections, i.e. are very slender, and for this reason are subject to flexure during the rotation induced by the spindle. This is avoided owing to the carriage elements 9 that accompany and support the bar 2 until it is completely introduced into the spindle and for the entire feeding time. Amongst other things, also the noises associated with the rotation of the bar 2 are reduced.

As can be appreciated from what has been disclosed above, the apparatus 1 enables the objects disclosed above to be reached. In particular, the apparatus 1, owing to the structural simplicity of the drum element 8 and of the carriage elements 9, and to the dimensions and the very moderate weight thereof, has reduced inertial mass, which enable the apparatus 1 to operate also at higher speeds compared to the ones reachable by the prior art apparatuses. Further, the simplified structural configuration, in addition to having lower manufacturing and maintenance costs than prior art apparatuses, leads to an advantageous and drastic reduction of inertia stress, a significant lowering of vibrations and thus great reliability and thus very limited and rapid maintenance interventions, this resulting in drastically reduced machine downtime. The compact dimensions and the limited longitudinal extent of the drum element 8 significantly facilitate the inspection interventions and accessibility to the apparatus 1, for example for possible control or replacement of an internal component. Maintenance operations and assembly/dismantling of components such as the carriage elements 9 located on the drum element 8 are particularly and advantageously facilitated.

It is possible to configure and size the apparatus 1 in a desired manner in function of the applications to which the apparatus 1 can be intended, and variations and/or additions to what has been disclosed and illustrated in the attached drawings are possible.

The invention claimed is:

1. Apparatus for feeding bars to a machine tool, comprising:
   a first end that is suitable for being placed in a position that is adjacent to a spindle of said machine tool;
   a stationary guiding and supporting arrangement for supporting a bar in a first support region, said stationary guiding and supporting arrangement extending along a longitudinal axis from a second end, opposite said first end, to an intermediate zone placed between said first end and said second end,
   a drum element extending between said first end and said intermediate zone and rotatable around a rotation axis parallel to said longitudinal axis,
   a movable supporting arrangement provided on said drum element and suitable for supporting a bar parallel to said longitudinal axis in a second support region adjacent to said first support region and extending between said intermediate zone and said first end,
   said movable supporting arrangement being slidably drivable along said drum element and parallel to said rotation axis between a contracted disengagement configuration, in which said movable supporting arrangement is collected near said first end to enable a bar to be positioned on said stationary guiding and supporting arrangement, and an extended engagement configuration, in which said movable supporting arrangement is distributed between said first end and said intermediate zone to engage with said bar to be supported and guided,
   wherein said first end is separated from said second end by a distance, said stationary guiding and supporting arrangement extends for a first length which is shorter than said distance, and said drum element extends for a second length which is shorter than said distance.

2. Apparatus according to claim 1, further comprising a supporting frame that extends from said first end to said second end, an end of said drum element being rotatably supported on a bush support fixed to said supporting frame in said intermediate zone.

3. Apparatus according to claim 1, wherein said second length has a value that is less than half said distance.

4. Apparatus according to claim 1 wherein said movable supporting arrangement comprises one or more supporting and guiding carriage elements, which are drivable by a dragging arrangement to be moved from said contracted disengagement configuration to said extended engagement configuration and vice versa.

5. Apparatus according to claim 4, wherein each carriage element comprises a cylindrical body, made of a single piece or of several parts that are fixed together to form a single body, inside which a transverse wall is provided in which a guiding and supporting opening is obtained that is suitable for being traversed by a bar.

6. Apparatus according to claim 4, wherein said movable supporting arrangement comprises groups of supporting and guiding carriage elements distributed on said drum element around said rotation axis, each group comprising three supporting and guiding carriage elements arranged in a mutually aligned position according to a longitudinal direction on said drum element.

7. Apparatus according to claim 6, further comprising a rotating driving device for rotating said drum element in an indexed manner so as to arrange one group of supporting and guiding carriage elements at a time, in a sequential manner, in an alignment position with said stationary guiding and supporting arrangement.

8. Apparatus according to claim 6, wherein each group of supporting and guiding carriage elements comprises a front carriage element nearer said first end, a rear carriage element further from said first end, and an intermediate carriage element interposed between said front carriage element and said rear carriage element.

9. Apparatus according to claim 8, wherein a connecting device is provided to connect together, and enable mutual approaching of, said rear carriage element, said front carriage element and said intermediate carriage element, said connecting device being configured in such a manner that a movement of said rear carriage element induced by said dragging arrangement, is followed by a movement of said intermediate carriage element and in turn of said front carriage element.

10. Apparatus according to claim 9, wherein said connecting device comprises a first bar element fixed to said intermediate carriage element and slidably coupled with said rear carriage element, and a second bar element fixed to said front carriage element and slidably coupled with said intermediate carriage element, said dragging arrangement comprising, for each group of supporting and guiding carriage elements, a slide element cooperating with a respective rear carriage element, and slidable along a respective grooved guide fixed longitudinally on said drum element.

11. Apparatus according to claim 1, wherein said stationary guiding and supporting arrangement comprises a "V" profiled guiding element conformed for receiving longitudinally a bar, a pushing element being further provided that is movable along said "V" profiled guiding element from said second end to said intermediate zone to push said bar to said second end through a respective group of supporting and guiding carriage elements aligned on said "V" profiled guiding element.

12. Apparatus according to claim 1, further comprising a storage chamber for said bars that is placed above said first support region, and is provided with a tilted resting surface for said bars, a picking-up and transferring device being provided for picking-up one bar at a time from said storage chamber to transfer the bar to said guiding and stationary supporting arrangement.

13. Apparatus according to claim 1, further comprising a control and synchronization unit configured for arranging a respective group of carriage elements in said alignment position and in said contracted disengagement configuration to enable a bar to be loaded onto said stationary supporting and guiding arrangement and to enable subsequently said group of carriage elements to be positioned in said extended engagement configuration and to start the advancement of the respective bar by said pushing arrangement.

* * * * *